(12) United States Patent
Johnson et al.

(10) Patent No.: US 6,821,414 B1
(45) Date of Patent: Nov. 23, 2004

(54) WATER TREATMENT APPARATUS

(75) Inventors: Martin Stanley Johnson, Leamington Spa (GB); Klaus Wiemer, Leichlingen (DE); Graham Williams, Birmingham (GB)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 10/088,299

(22) PCT Filed: Aug. 30, 2000

(86) PCT No.: PCT/GB00/03329
§ 371 (c)(1),
(2), (4) Date: Jun. 21, 2002

(87) PCT Pub. No.: WO01/19734
PCT Pub. Date: Mar. 22, 2001

(30) Foreign Application Priority Data

Sep. 14, 1999 (GB) ............................................ 9921659

(51) Int. Cl.[7] .......................... B01D 35/18; B01D 27/00
(52) U.S. Cl. ........................ 210/97; 210/181; 210/184; 210/259; 210/416.3
(58) Field of Search ......................... 210/97, 180, 181, 210/182, 183, 184, 259, 260, 264, 283, 290, 416.1, 416.3, 185

(56) References Cited

U.S. PATENT DOCUMENTS

| | | | |
|---|---|---|---|
| 1,488,696 A | * | 4/1924 | Moffat ........................ 210/120 |
| 3,487,934 A | * | 1/1970 | Seyler ......................... 210/169 |
| 4,502,955 A | * | 3/1985 | Schaupp ...................... 210/149 |
| 4,764,271 A | * | 8/1988 | Acosta ......................... 210/86 |
| 4,844,796 A | * | 7/1989 | Plester ........................ 210/100 |
| 4,948,499 A | * | 8/1990 | Peranio ...................... 210/180 |
| 5,587,055 A | | 12/1996 | Hartman et al. |
| 5,766,333 A | * | 6/1998 | Lukens ........................ 106/280 |
| 5,858,248 A | | 1/1999 | Plester et al. |

FOREIGN PATENT DOCUMENTS

WO      WO0025887 A      11/2000

* cited by examiner

Primary Examiner—Fred G. Prince
(74) Attorney, Agent, or Firm—Sutherland Asbill & Brennan LLP (57) ABSTRACT

The invention provides an improved means of purifying water which comprises a water treatment apparatus comprising a treatment housing (10, 60) having an inlet (18, 65) for the water to be treated, an outlet (25, 67) for the treated water, a heater (17, 76) within the housing to come into direct contact with the water and a filter (22, 23, 78, 79) between the heater and the outlet, characterised in that means (38, 81) are provided to fill the housing with water up to a maximum level which leaves a headspace (10A, 80A) between the water and the roof (14, 61) of the housing, the entrance to the outlet being below the operating water level (10B, 80).

28 Claims, 5 Drawing Sheets

WATER TREATMENT APPARATUS

This invention relates to water treatment and is particularly concerned to provide a means of purifying water in an apparatus suitable for use in a post-mix beverage dispenser, although it will be appreciated that water treated according to the invention may be used for other purposes.

Water quality and purity vary considerably from location to location and it is an object of the invention to provide a means whereby the water to be used in a post-mix dispenser or for other use can be rendered of the desired quality and purity using a relatively simple to operate and renewable means.

To be suitable for use in beverages water should not have excessive bicarbonate, carbonate and organic matter. Chlorine and heavy metals may also need to be removed.

It is also an object of the invention to provide an improved water treatment device in which blockage of water flow through the device by the necessary precipitation of the unwanted impurities can be ameliorated.

It is known from U.S. Pat. No. 4,844,796 to provide a water treatment apparatus for post-mix beverage dispensers in which the water to be treated is passed into a removable disposable cartridge having a first, reactor section and a second, filter section wherein the water is heated in the reactor section firstly by passing through a heat exchanger and secondly by means of a heater. The heater is positioned in a central aperture defined by an annular portion of the cartridge whereby it does not come into direct contact with the water.

A similar heater arrangement is disclosed in U.S. Pat. No. 5,858,248 where the heater can be located in the central cavity of a disposable cartridge of a water treatment device. Alternative heater arrangements disclosed in this application are to position the heater around the outer cylindrical surface of the cartridge or to have a gas cylinder heater beneath a central "chimney", i.e. the central cavity defined by the annular portion of the cartridge.

In all these heater embodiments, the beater is kept separated from the water under treatment. It does not become covered in deposits of the precipitated impurities that come out of solution in the water during the heating and sieving stages that take place in the cartridge. Thus the heaters are reusable and not disposed of with the disposable cartridges.

We have now surprisingly found that an efficient and economic water purification means may be achieved without the need to separate the heater from the water under treatment and hence without the need for the heater to have a long built-in life expectancy.

Accordingly, in one aspect the invention provides a water treatment apparatus comprising a treatment housing having an inlet for the water to be treated, an outlet for the treated water, a heater within the housing to come into direct contact with the water and a filter between the heater and the outlet, and means to fill the housing with water up to a maximum level which leaves a headspace between the water and the roof of the housing, the entrance to the outlet being below the operating water level.

Preferably the inlet is arranged so that the water travels upwardly within the housing.

Conveniently, the housing is in the form of a disposable cartridge which may be dispensed with, including its heater, when its life expectancy is reached.

The cartridge may contain one or more perforated screens or meshes between the beater and the filter but this is not essential.

Thus in one preferred embodiment the apparatus comprises a cylindrical housing having an inlet for the water to be treated, a heater spaced above the base of the housing and, extending within the cylindrical housing, one or more perforated screen(s) above the heater, a filter above the screen(s) and an outlet for the treated water above the filter. The outlet may conveniently be through the closed upper end of the cylinder.

The outlet extends beneath the level of the water so that hot water leaves the treatment housing without going through the headspace. Steam and volatiles collect in the headspace and may be allowed to escape through a pressure relief valve, as is described in more detail below.

The unfiltered water, e.g. from the mains, may first pass through a heat exchanger to warm it before it passes into the housing. Treated heated water leaving the housing may be passed in the opposite direction through the heat exchanger to act as the heat exchange medium to warm the incoming mains water. The treated water is, thereby, conveniently cooled before being passed to a reservoir or for direct use.

In another preferred embodiment the heat exchanger and the water treatment housing may be contained in a single unit, preferably with the heat exchanger directly beneath the water treatment housing. This may be a unitary structure or two separate units, water treatment housing and heat exchanger, which may be completely or partially disposable. For example, the water treatment housing may be a disposable cartridge and the heat exchanger non-disposable.

This single unit arrangement has the advantage that pipework between the heat exchanger and the water treatment housing can be considerably reduced, if not eliminated. The heated water from the heat exchanger may pass directly into the water treatment housing and the treated water from the housing can pass directly back to the coils of the heat exchanger in order to heat the incoming water. This arrangement reduces the regions where precipitation deposits may build up and harmfully affect water flow. Also, with the heat exchanger directly below the water treatment housing, the inlet to the water treatment housing can readily enter at its cooler, lower end.

The inlet for the water to be treated may conveniently enter through the floor of the treatment housing but this is not essential. For example, in some embodiments the water to be treated may enter the housing through a pipe entering the housing through or near the roof, which pipe extends downwardly inside the housing towards its base. On leaving the pipe water, once the hosing is filled to the lower end of the pipe, will then travel upwardly.

In another aspect the invention provides a water treatment apparatus comprising a treatment housing and a heat exchanger, the treatment housing having an inlet for the water to be treated, an outlet for the treated water, a heater within the housing and a filter between the heater and the outlets the inlet to the treatment housing receiving water that has passed from a source of untreated water through the heat exchanger and the outlet from the treatment housing passing treated water back through the heat exchanger, and a bypass valve to close the heat exchanger to incoming untreated water and to allow the incoming untreated water to flow directly into the treatment housing, whereby the hot treated water passing through the heat exchanger sterilises the heat exchanger.

The bypass valve means may conveniently be a first valve on the inlet pipe to the heat exchanger which is open during normal operation to allow inflow of untreated water, e.g. mains water, and a bypass valve in a bypass pipe between the source of untreated water and the first valve.

The bypass valve is closed during normal operation. In sterilisation mode, the first valve is closed and the bypass valve is opened, thereby allowing water into the bypass pipe which takes the untreated water directly into the treatment housing inlet.

This sterilisation arrangement may be used with side by side separate units, or single units, which may be used one above the other as described above, and with housings having heaters which may or may not be in direct contact with a the water.

Where the water treatment housing and the heat exchanger are housed side by side rather than one beneath the other, their upper ends may conveniently be closed by an appropriately shaped and gasketted single plate, e.g. of steel. The necessary pipework for the required water flows into and out of the two housings can then pass through appropriately sized and gasketted holes in the plate. However, in another embodiment this closure plate is replaced by a double skinned cover plate formed in two parts, preferably by injection moulding of plastics material. Integral galleries are moulded inside the plate to provide the necessary flow passages. Thus much of the external pipework into and out of the two housings can be eliminated and replaced by large-section integrally moulded passageways that are less likely to become blocked by deposits. Moreover, the double skinned plate can readily be opened, and stripped and cleaned more easily.

We have surprisingly found that the direct contact of the heater and the water it is heating does not harmfully affect the efficiency of the treatment process. Deposits, largely of calcium carbonate, form on the heater surface but they only build up to a degree and then break off and fall to the floor of the container. Moreover, we have found that deposits also build up around the interior wall or walls of the housing and also a "roof" of deposits can build up on the lower surface of the lowermost screen or the lower surface of the filter when no screen is used. The water being treated, therefore, once this build up has occurred is in effect treated in an inner housing formed by accumulated deposits on the floor of the housing, an annular build up of deposits on the walls and the "roof" formed of deposits. The deposit build up is sufficiently porous not to impede flow to any significant extent and the "roof" may indeed act as a further filtration medium. Sufficient turbulence may be created during the treatment process to ensure that the build up of deposits on the heater breaks off from time to time so that the beating efficiency of the heater is not unduly impaired. The wattage density of the heater may be chosen, e.g. between 20 and 30 watts/cm$^2$, to give sufficient power density to cause the deposits to bake, crack and fall off before any substantial thickness of deposit is formed. Alternatively, it may be found advantageous occasionally to take steps to break off these deposits on the heater. For example, the heater may be switched off and then given a burst of power. This "burst" could conveniently be applied, say, overnight when the water treatment is out of use so that break off of deposits may occur when the apparatus is brought into use the next day.

In other embodiments ultrasonic or other vibration, e.g. caused by AC mains frequency, of the heater may be used, if necessary, to break the deposits on the heater. The heater surfaces may also be polished or coated with low-friction material in order to assist breaking off of the deposits.

It will be appreciated that the wattage capacity of the heater will vary according to the volume and, particularly, to the through put of the water treatment housing. For example, a heater of from 1000 to 1200 watts can usefully be employed for a throughput of 12 to 18 liters per hour, i.e. the input of water into the treatment housing.

Conveniently, once the water treatment housing has initially filled up with water to the maximum desired level, the outlet may be retained in the open position for continuous flow, subject to a satisfactory water temperature having been reached and maintained, which is monitored by a temperature probe, e.g. a thermistor, and the inlet may be opened and closed as required to replenish the housing, the need for replenishment being detected by one or more water depth probes in the upper part of the housing. Thus the water depth probe or probes are used to trigger the switching on or off of water flow as required, e.g. through a valve and pressure regulator from a mains water supply.

As the water level, therefore, never goes above the maximum level defined by that water depth probe, the required headspace is provided between the water and roof of the housing. The headspace, as indicated above, receives steam from the heated water and this may include unwanted volatiles from the water.

In a more preferred embodiment the probes are fitted within a separate chamber within the housing, which chamber only receives treated water after it has passed through the heating stage, any screens and the filter. Such an arrangement is described in our co-pending International patent application no. PCT/GB99/03509 and has the advantage that the probes are not rendered inoperative by gradual calcification.

The water depth probes and/or additional probes may also be used to measure and monitor water quality, for example the ionised condition of the treated water. This may conveniently be done by measurement, for example, of the difference in conductivity or capacitance between the untreated and the treated water.

In a typical prior art water treatment device for post-mix beverages, water at ambient temperature, say about 10° C., from the mains may be heated to about 90° C. in the heat exchanger, passed to the water treatment housing where it is heated to about 115° C. and then cooled in the heat exchanger to about 20° to 30° C. If desired, the water treatment apparatus of the present invention may be operated at similar water temperatures.

However, we have found that considerable deposits of impurities, particularly calcium carbonate, can build up in regions of the apparatus where they can harmfully affect performance, when such temperatures are used. For example, as the temperature of the incoming water heats up on its passage through the heat exchanger, deposits build up in the heat exchanger and these deposits can be significant in the final quarter of the heat exchanger passageways, where the water temperature is at its highest. The pipework leading from the heat exchanger to the water treatment housing area can also become badly "furred", thereby reducing its diameter. Of course, this latter problem can be ameliorated as suggested above by building the heat exchanger and water treatment housing as a unit. It is also possible to increase the diameter of the pipes and/or to use insulated pipes or internal surface polishing or non-stick coating.

We have, however, found that these unwanted deposits can be reduced, so that greater deposition can take place in the intended deposition regions, if the water temperature is constrained within different limits. For example, instead of heating the water to 90° C. in the heat exchanger, it may be heated only to about 70° to 75° C. and passed into the water treatment housing at that lower temperature. It is then heated by the heater to about 115° C. as usual but then is cooled, e.g. by a coil and fan arrangement to, for example 75° to 85° C., say 80° C., before passing back through the heat exchanger. Deposits in the heat exchanger and in the pipework can thereby be greatly reduced.

Where more than one perforated screen or mesh are used, they may be of the same or different perforation sizes. For example, they may have apertures from 1 to 2 per inch. The perforated screens may have depending legs protruding downwardly from their undersides whereby the build up of deposits may take a corrugated form, thereby increasing the surface area of deposit and thereby prolonging the life of the unit by delaying the time when the build up is sufficient to harm performance.

The filter may be of any suitable material. We have found that cellular sponge-like plastics material, e.g. reticulated polyester based polyurethane foam, is particularly useful.

The water treatment housing is preferably fitted with a pressure relief valve which may operate, for example, at about 0.7 bar. Steam containing unwanted volatiles from the water passes from the headspace through the relief valve and may be cooled in a condenser tube before being allowed to drain away. For example the evaporation rate through this valve over a period of use of the apparatus may be of the order of 2% by weight of the water being treated. Preferably the pressure relief valve is a dead-weight relief valve of the type well known in the art.

Treated water from the apparatus of the invention will normally be passed to a reservoir, e.g. a bag in a box type reservoir, where it can cool before being drawn off for use. Moreover, the presence of a reservoir between the water treatment housing and the facility in which the treated water is to be used ensures that the facility cannot overdraw or suck treated water directly out of the treatment housing and thereby harmfully reduce the necessary operating pressure therein. In another preferred embodiment, therefore, the reservoir is provided with separate inlet and outlet pipes and the entry to the outlet pipe within the reservoir is positioned to be remote from the exit end of the inlet pipe within the reservoir. This also helps to prevent regions of "static" water sitting within the reservoir and not being drawn off which improves water hygiene, particularly for drinks dispensers. In this embodiment, the inlet and outlet pipes may be separately connected into the reservoir or they may form part of a single connector provided that their exit and entry positions respectively are remote from each other as described above.

When the treated water reservoir becomes fill, water flow through the apparatus is stopped, preferably by automatic control means, and the heater may be controlled to allow the heated water temperature to drop to, say, about 90° C., i.e. the water is maintained at a lower temperature in a standby mode, so that when flow to the reservoir is again needed, the response time for the water to reach full treatment temperature is relatively fast.

The apparatus of the invention may conveniently be provided with a safety-first service function whereby it may be opened for servicing and cleaning. The apparatus may be housed in a cabinet, the door to which is closed by a controlled bolt operation, e.g. by a solenoid operated by a control board. The control board may be programmed whereby the solenoid cannot release the bolt until the water temperature within the apparatus has fallen to a predetermined level, e.g. 50° C. When the control board is appropriately activated, e.g. by the pressing of a "service" button, the following actions may then be automatically carried out. The outlet for treated water from the water treatment housing is closed and the heater is switched off. The inlet, e.g. for mains water into the apparatus is opened or maintained open if already open. Mains or other supply water floods through the apparatus as the supply water is regulated to a pressure above the operating pressure within the water treatment housing. As the housing outlet for treated water is closed, the incoming water forces hot water already in the apparatus out through the pressure relief valve. Mains water is passed into the apparatus until an internal temperature sensor e.g. thermistor probe, indicates that the desired cooler temperature has been reached. The control board then actuates the switching off of the water supply and instructs the solenoid to release the bolt to allow the cabinet door to be opened. After servicing and closure of the cabinet door, the solenoid lock on the bolt is re-set. This service function can allow servicing access much more quickly e.g. within a few minutes, compared with allowing the apparatus to cool normally. By way of example only, if the water treatment housing and the heat exchanger together hold six liters of water, passage of about 8 liters of cold mains water can reduce the temperature to 50° C. in six to eight minutes.

In yet another embodiment, the efficiency of the heat exchanger may be improved by allowing a proportion of the untreated water leaving its-outlet to be drawn off, e.g. to drain away, rather than it all passing into the water treatment housing. Thus more cold water, e.g. from the mains, needs to be passed into the heat exchanger to achieve the same throughput, thereby resulting in an increased cooling effect on the treated water passing back and through the beat exchanger. This effect may be sufficient to eliminate the need for the coil and fan cooling arrangement described above for the cooling of the treated water before it enters the heat exchanger for cooling.

Embodiments of the invention will now be described by way of example only with reference to the accompanying drawings in which.

Figure 1:
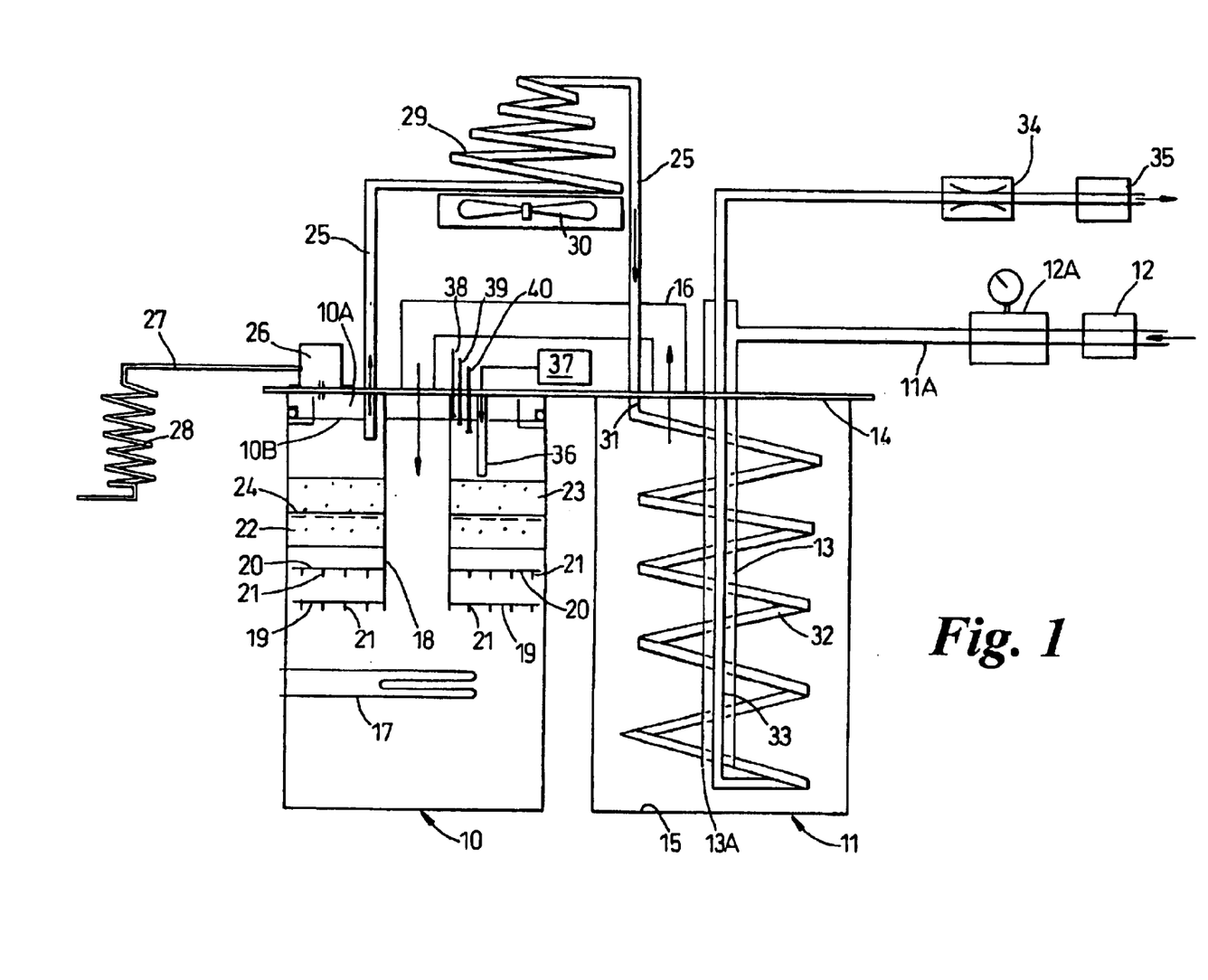
FIG. 1 is a diagrammatic illustration of one water treatment apparatus according to the invention.

In FIG. 1 is shown a water treatment apparatus of the invention in which a water treatment, housing comprising a cartridge 10, and a heat exchanger 11 are aligned side by side.

An inlet solenoid 1 controls supply of untreated, usually mains, water into the heat exchanger 11 via a pipe 11A. (The direction of water flow through the apparatus is indicated generally by arrows.). When the inlet solenoid is operated to allow water inflow, the untreated water then passes via an inlet pressure regulator 12A into inlet tube 13 which extends through cover plate 14 closing the top of the heat exchanger and down towards the base 15 of the heat exchanger. Cover plate 14 also extends to close the top of cartridge 10. As indicated above, the plate 14 is conveniently sealed to the top of the cartridge 10 and heat exchanger 11 by a gasket (not shown). Tube 13, by way of example only, may be 13 mm in internal diameter. Water flowing down through tube 13 exits at its lower end 13A and, when the heat exchanger is filled with water, then exits through the cover plate 14 into tube 16, which may be of 18 mm internal diameter and leads through cover 14 to discharge the untreated water through the top of cartridge 10.

Heat exchanger 11 also contains a return coil to receive treated water from cartridge 10 and this will be described in more detail below.

Inside the water treatment housing cartridge 10 is a high density electric heating element 17, of, say 1200 Watts capacity, in the lower half of the cartridge. Element 17 is connected to conventional electrical circuitry (not shown) whereby the heater can be switched on and off as required.

Untreated water entering cartridge 10 from tube 16 passes down a larger diameter internal tube 18 which is shown extending approximately half way down the height of the cartridge but could, if desired, extend nearly to the floor. Tube 18 may be, for example of acetal resin and have an internal diameter of 25 mm and an external diameter of 35 mm. Incoming water fills cartridge 10, thereby surrounding heater 17 and is heated thereby.

Surrounding tube 18 and positioned just above its lower end are two screens 19 and 20, one above the other. Each screen has a plurality of depending legs 21 on which deposits from the heated water can form. The screens may be of mesh size from 1 to 2 per inch, for example.

Above screens 19 and 20 is a double layer of fine filter material 22, 23 separated by a screen mesh layer 24. By way of example only, the filter layers 22 and 23 may be about 10 mm to 30 mm each in thickness and may be formed of compressed polyester fibre or reticulated polyester based polyurethane foam or a combination thereof.

Heated water is forced upwardly through the screen and filter layers by pressure of the incoming untreated water and exits the cartridge 10 through outlet tube 25 which passes through cover plate 14. Delivery pressure of the treated water into tube 25 whose inlet end is below the water level 10B and is governed by the boiling taking place in the headspace 10A of cartridge 10 above the water level 10B and is controlled by pressure relief valve 26 which allows hot water and/or steam with unwanted volatiles to escape into relief tube 27 and cooling coil 28 when the internal pressure in the cartridge exceeds a predetermined value, e.g. 0.7 bar.

The hot treated water passes through tube 25 via a cooling tube 29 and fin 30 into heat exchanger 11 at an inlet 31 in cover plate 14. The treated water passes through a coil 32 towards the base 15 of the heat exchanger from where it is passed upwardly through a tube 33 which passes inside the inlet tube 13 for cold incoming water. Tube 33 exits through cover plate 14 and the treated, cooled water passes via an outlet flow restrictor 34 and an outlet solenoid valve 35 to a reservoir (not shown).

As indicated above, the untreated water may enter the heat exchanger at about 10 or 20° C. and be heated to about 115° C. in cartridge 10. A thermistor 36 positioned just above filter layer 23 measures the treated water temperature and is connected to a control board 37 whereby passage of treated water through the outlet solenoid valve can be prevented until the correct temperature has been reached. Depth probes 38, 39, 40 extend inside the top of cartridge 10 and may also be connected to the control board. Probe 38 indicates when the maximum required depth of water in the cartridge has been reached, probe 39 indicates that the water level is low and probe 40 indicates that the minimum water level has been reached. The control board is then actuated appropriately to start or stop the process and the water flow.

The cold water entering the system may be warmed in the heat exchanger by the outgoing treated water to, say, 72° C., the treated water may be initially cooled by coil 29 and fan 30 to about 80° C. and then finally cooled in the heat exchanger to exit the apparatus at about 35° C.

A typical flow rate may be 12 to 24 liters per hour for a water treatment cartridge of volume 3.5 liters.

It will be appreciated that all these figures are for illustration only and may vary widely.

Figure 2:
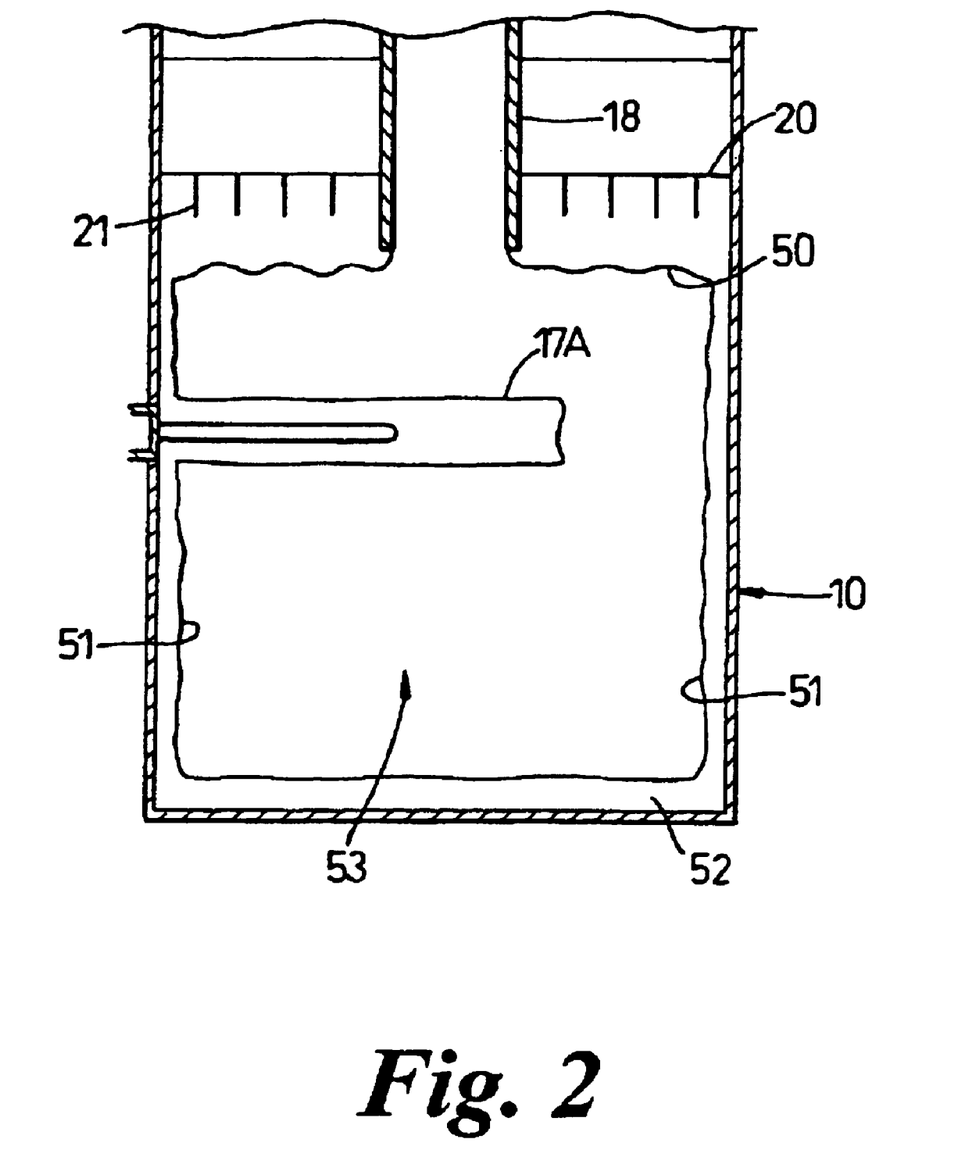
FIG. 2 is a diagrammatic representation of a portion of the water treatment housing of the apparatus of FIG. 1 showing the build up of an inner housing of deposits.

In FIG. 2 is shown a portion of cartridge 10 of FIG. 1 after build up of deposits, mainly of calcium carbonate, within the cartridge.

Heater 17 can be seen in outline as it has a covering 17A of deposit prior to its cracking and breaking away from the heater. An undulating "roof" 50 of deposits has formed over legs 21 of screen 19 but legs 21 of upper screen 20 are still visible as is the lower end of tube 18. The interior wall of cartridge 10 has a layer 51 of deposited material and its base is covered by a layer 52 of deposits. Roof 50, wall layers 51 and floor layer 52 in effect form an inner housing or "igloo" 53 within which the heat treatment of the water takes place.

Figure 3:
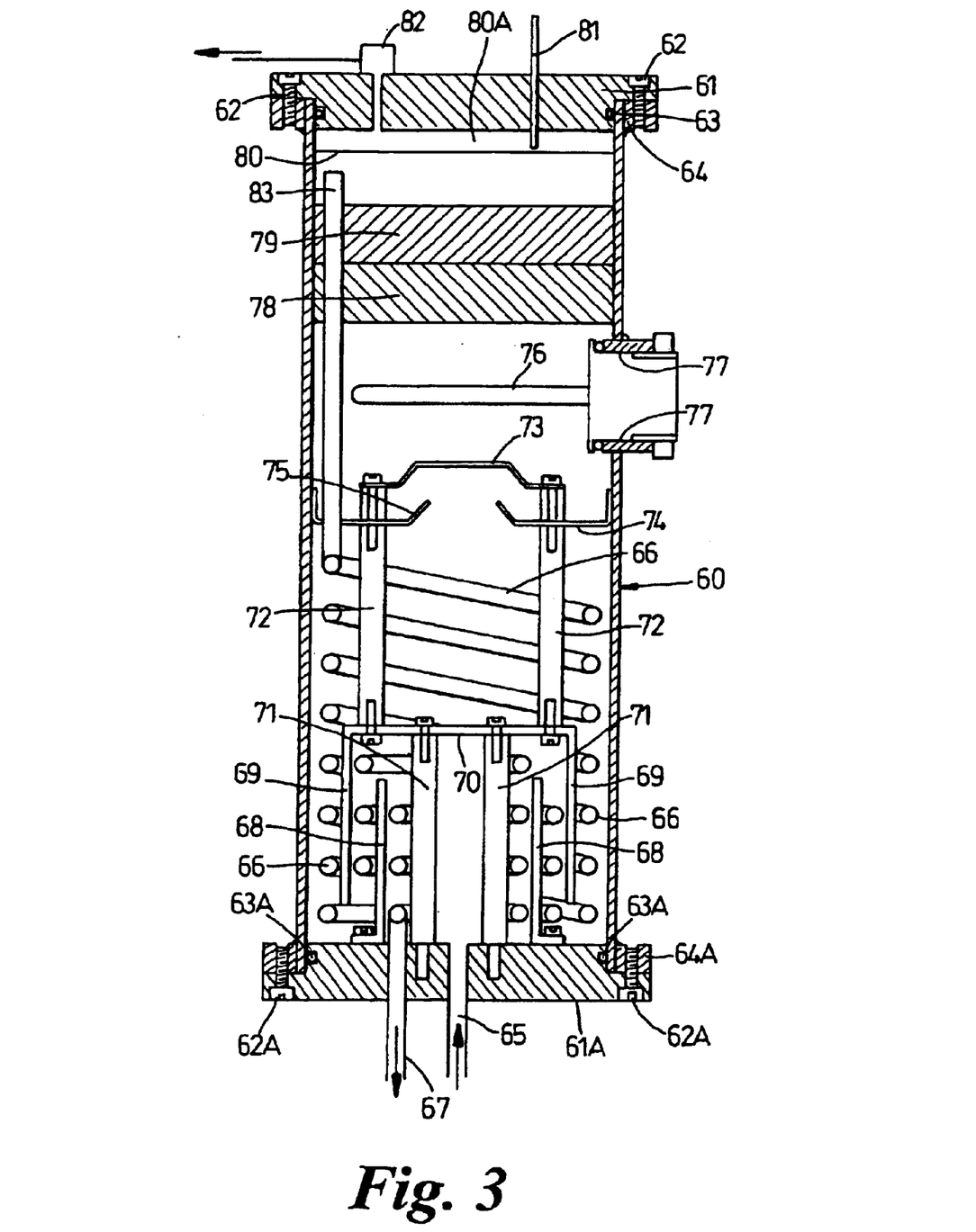
FIG. 3 is a diagrammatic illustration of a second water treatment apparatus according to the invention.

In FIG. 3 is shown an alternative type of water treatment apparatus of the invention in which the heat exchanger and the water treatment housing are situated in a single cartridge-type housing 60, with the heat exchanger lowermost. Cartridge 60 may, for example, be of stainless steel tube of about 0.5 to 1 mm wall thickness. The cartridge is closed at its upper end by a plastics end cap 61 held in position by six screws 62 (only two of which are visible) and sealed to the wall of the cartridge by an O-ring 63. Screws 62 screw into a stainless steel ring 64 welded around the outside of the upper end of the cartridge tube.

The cartridge is similarly closed at its lower end by a plastics end cap 61A, six screws 62A, an O-ring seal 63A and stainless steel ring 64A.

An inlet 65 for cold untreated water passes through plate 61A into the lower, heat exchanger, portion of cartridge 60. This lower portion contains heat exchanger coils 66 for the returning treated water which, when cooled, passes out of cartridge 60 via outlet 67 in plate 61A. Baffles 68 extend vertically upwardly from the interior surface of plate 61 A and baffles 69 extend downwardly from cross member 70 which is itself mounted on rods 71 which also extend upwardly from the plate 61A. Mounted on and extending above cross member 70 is a pair of further rods 72 which support a stainless steel closure member 73 forming a scale trap with stainless steel arms 74 and 75 extending inwardly from the wall of the cartridge. The baffles and rods may be of acetal resin, for example, and provide a turbulent flow path for the incoming cold water as it extracts heat from the outflowing treated water.

Above scale trap 73, 74, 75 is a heater 76 sealed into an opening defined in the cartridge wall by an annular flange 77. Above heater 76 is a first coarse filter 78 and, above that, a second finer filter 79. The water level in the cartridge is indicated at 80, leaving a headspace 80A, and is monitored by a probe 81 which may be connected to a control board as described with reference to FIG. 1. A relief valve 82 in the plate 61 allows escape of steam and/or hot water at a predetermined pressure.

Tube 83, whose upper end is above filter 79, allows the heated, treated water to flow downwardly into heat exchanger coils 66 and from there to outlet 67. As before, the outlet 67 may lead to a reservoir for the treated water.

This apparatus may be controlled and operated in a similar manner to that described with reference to FIG. 1 but it will be noted that there is considerably less pipework between the heat exchanger and water treatment portions of the apparatus, thereby considerably reducing potential blockage points by deposits from the water.

Figure 4:
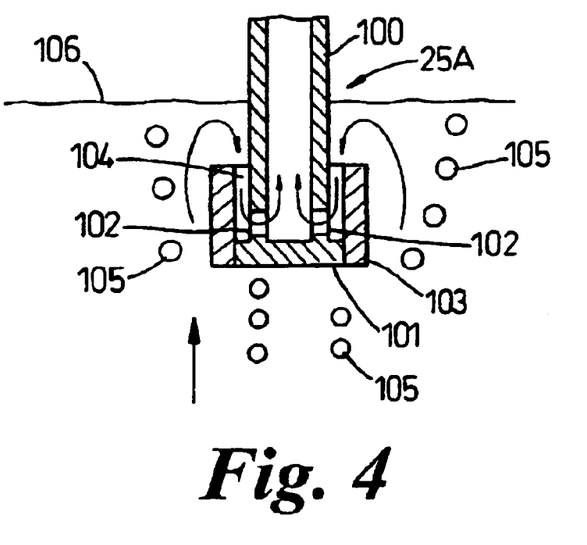
FIG. 4 is a sectional view of an alternative outlet tube arrangement from a water treatment housing.
Figure 5:
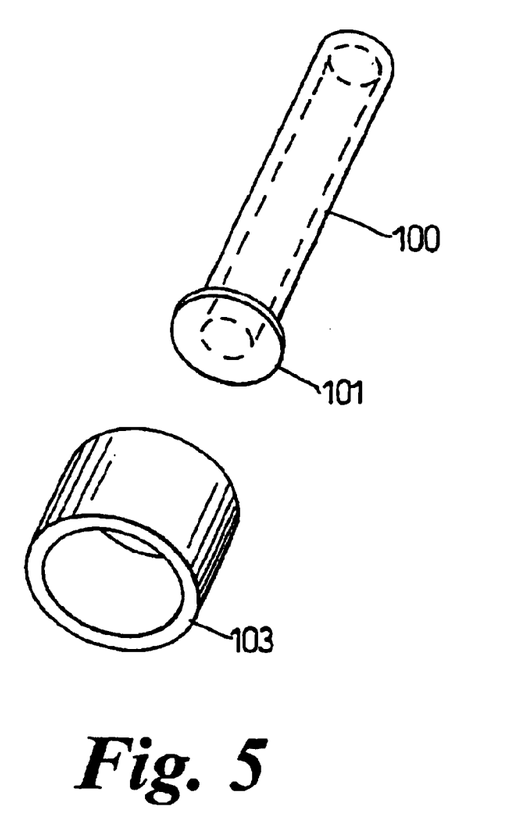
FIG. 5 is an exploded perspective view of the embodiment of FIG. 4.

In FIGS. 4 and 5 is shown an outlet pipe 25A having a modified end to form a labyrinth to prevent bubbles, which may include unwanted volatiles, passing through the outlet tube.

This modified outlet pipe replaces pipe 25 shown in FIG. 1 and the end portion of the pipe shown in FIG. 4 lies inside the (not shown) cover 14 of FIG. 1.

Pipe 25A has a conventional pipe end portion 100, which passes through cover 14 of the treatment housing. It is, however, closed at its inner end by an end cap 101 of larger diameter than the outer diameter of pipe portion 100. Holes 102 are positioned through the wall of pipe portion 100 close to its end cap 101. These holes are visible in FIG. 4 but not in FIG. 5. End cap 101 is fitted tightly into a sleeve 103 which extends along the exterior of pipe portion 100 for a short distance beyond holes 102, thereby providing an annular passage 104 through which hot treated water may flow downwardly and then through holes 102 into the interior of pipe portion 100 and then out of the water treatment housing. Bubbles 105 of, for example, unwanted volatiles, flow upwardly as indicated by the arrow to the liquid surface 106 but cannot pass downwardly to pass through the labyrinth arrangement of outlet pipe 25A and, hence, are prevented from passing through the outlet with the treated water.

Figure 6:
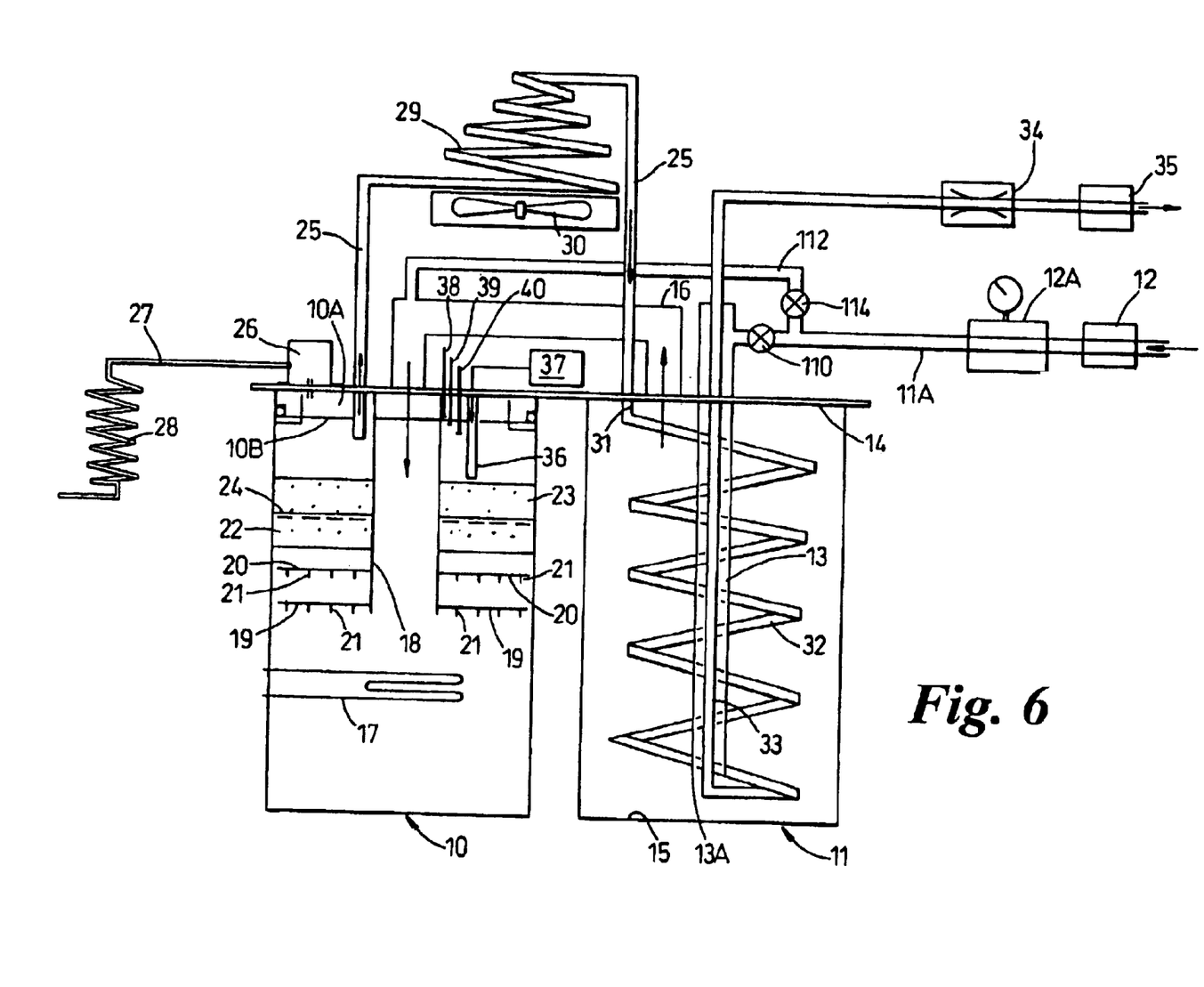
FIG. 6 is a diagrammatic illustration of a modified apparatus of FIG. 1.

In FIG. 6 is shown an alternative form of apparatus having a sterilising function for the heat exchanger. The apparatus is essentially the same as that shown in FIG. 1 and like parts have been numbered identically in FIG. 6 and are not described in detail again hereafter.

The modified apparatus has a valve 110 on the pipe 11A, valve 110 being positioned between inlet pressure regulator 12A and the entry to inlet tube 13 into heat exchanger 11. Between regulator 12A and valve 110 a branch pipe 112 leads off from pipe 11A to enter tube 16 before the latter leads through cover 14 into the water treatment housing 10. A valve 114 controls entry to pipe 112 from pipe 11A.

During normal operation of the apparatus valve 114 is closed and valve 110 is open. Water, therefore, flows into the heat exchanger 11, from there into water treatment housing 10 and from there back through heat exchanger 11 to outlet valve 35 and thence to a reservoir just as described with reference to FIG. 1.

In order to sterilise the heat exchanger, valve 110 is closed and valve 114 opened Cold incoming water, therefore, bypasses the heat exchanger 11 and flows through pipe 112 and tube 16 directly into the water treatment housing 10, i.e. it is not pre-heated. Hot treated water passes back through coil 32 in the heat exchanger which, in the absence of cooling incoming water, rises in temperature to say, above 85° C. The heat exchanger and the outlet tubing therefrom are thereby sterilised.

What is claimed is:

1. A water treatment apparatus comprising a treatment cartridge having an inlet for the water to be treated, an outlet for the treated water, a heater within the cartridge to come into direct contact with the water, and a filter between the heater and the outlet, characterised in that means are provided to fill the cartridge with water up to a maximum level which leaves a headspace between the water and the roof of the cartridge, the entrance to the outlet being below the operating water level.

2. A water treatment apparatus according to claim 1, characterised in that the water to be treated first passes through a heat exchanger where it is warmed before it passes to the cartridge.

3. A water treatment apparatus according to claim 2, characterised in that treated water leaving the cartridge is passed through the heat exchanger to warm the incoming untreated water.

4. A water treatment apparatus according to claim 2, characterised in that the heat exchanger and the water treatment cartridge are contained within a single unit.

5. A water treatment apparatus according to claim 1, characterised in that the heater has a wattage density of from 20 to 30 watts/cm$^2$.

6. A water treatment apparatus according to claim 1, characterised in that it has a throughput of 12 to 18 liters of untreated water per hour into the housing cartridge and a heater of from 1000 to 1200 watts.

7. A water treatment apparatus according to claim 1 characterised in that a temperature probe is positioned in the cartridge to monitor the water temperature.

8. A water treatment apparatus according to claim 7, characterised in that the probes are fitted within a separate chamber within the cartridge, which chamber only receives heated treated water after it has passed through the filter.

9. A water treatment apparatus according to claim 1, characterised in that the means to fill the cartridge with water up to a maximum level comprises a water depth probe.

10. A water treatment apparatus according to claim 9, characterised in that two or more water depth probes are used to monitor water levels in the cartridge.

11. A water treatment apparatus according to claim 1, characterised in that one or more probes in the cartridge are used to measure water quality.

12. A water treatment apparatus according to claim 1, characterised in that the treated water is passed to a reservoir, the reservoir having an inlet and an outlet pipe, the entry to the outlet pipe within the reservoir being remote from the exit end of the inlet pipe.

13. A water treatment apparatus according to claim 12, characterised in that automatic control means are provided to stop water flow through the apparatus when the reservoir is full.

14. A water treatment apparatus according to claim 13, characterised in that the control means also control the heater to allow the heated water to be maintained at a lower temperature in standby mode when the water flow is stopped.

15. A water treatment apparatus comprising a disposable treatment cartridge having an inlet for the water to be treated, an outlet for the treated water, a dispensable heater within the cartridge to come into direct contact with the water, and a filter between the heater and the outlet, characterised in that means are provided to fill the cartridge with water up to a maximum level which leaves a headspace between the water and the roof of the cartridge, the entrance to the outlet being below the operating water level.

16. A water treatment apparatus comprising a treatment housing having an inlet for the water to be treated, an outlet for the treated water, a heater within the housing to come into direct contact with the water, and a filter between the heater and the outlet characterised in that means are provided to fill the housing with water up to a maximum level which leaves a headspace between the water and the roof of the housing, the entrance to the outlet being below the operating water level, and the housing contains one or more perforated screens between the heater and the filter.

17. A water treatment apparatus according to claim 16, characterised in that the housing is cylindrical, the heater is spaced above the base of the housing, the perforated screens are above the heater, the filter is above the screens and the outlet for treated water is above the filter.

18. A water treatment apparatus according to claim 16, characterised in that at least one perforated screen has depending legs protruding downwardly from its underside.

19. A water treatment apparatus comprising a treatment housing having an inlet for the water to be treated, an outlet for the treated water, a heater within the housing to come into direct contact with the water, and a filter between the heater and the outlet, characterised in that means are provided to fill the housing with water up to a maximum level which leaves a headspace between the water and the roof of the housing, the entrance to the outlet being below the operating water level, the water to be treated first passes through a heat exchanger where it is warmed before it passes to the housing, the heat exchanger and the water treatment housing are contained within a single unit, and the heat exchanger is positioned directly below the water treatment housing.

20. A water treatment apparatus comprising a treatment housing having an inlet for the water to be treated, an outlet for the treated water, a heater within the housing to come into direct contact with the water, and a filter between the heater and the outlet, characterised in that means are provided to fill the housing with water up to a maximum level which leaves a headspace between the water and the roof of the housing, the entrance to the outlet being below the operating water level, the water to be treated first passes through a heat exchanger where it is warmed before it passes to the housing, the heat exchanger and the water treatment housing are contained within a single unit, and the water treatment housing and the heat exchanger are housed side by side and one cover plate closes the upper ends of both.

21. A water treatment apparatus according to claim 20, characterised in that the cover plate is a double-skinned plate formed by moulding in two parts which define internal galleries to provide the flow passages for the water.

22. A water treatment apparatus comprising a treatment housing having an inlet for the water to be treated, an outlet for the treated water, a heater within the housing to come into direct contact with the water, and a filter between the heater and the outlet, characterised in that means are provided to fill the housing with water up to a maximum level which leaves a headspace between the water and the roof of the housing, the entrance to the outlet being below the operating water level, and the apparatus includes means to vibrate the heater.

23. A water treatment apparatus comprising a treatment housing having an inlet for the water to be treated, an outlet for the treated water, a heater within the housing to come into direct contact with the water, and a filter between the heater and the outlet, characterised in that means are provided to fill the housing with water up to a maximum level which leaves a headspace between the water and the roof of the housing, the entrance to the outlet being below the operating water level, and the apparatus is housed in a cabinet, the door of the cabinet being closed by a controlled bolt mechanism, the control means being programmed to release the bolt only when the water temperature in the housing has fallen to a predetermined level.

24. A water treatment apparatus comprising a treatment housing having an inlet for the water to be treated, an outlet for the treated water, a heater within the housing to come into direct contact with the water, and a filter between the heater and the outlet, characterised in that means are provided to fill the housing with water up to a maximum level which leaves a headspace between the water and the roof of the housing, the entrance to the outlet being below the operating water level, the water to be treated first passes through a heat exchanger where it is warmed before it passes to the housing, and the apparatus includes means to allow a proportion of the untreated water leaving the heat exchanger outlet to be drawn off instead of passing to the treatment housing.

25. A water treatment apparatus comprising a treatment housing having an inlet for the water to be treated, an outlet for the treated water, a heater within the housing to come into direct contact with the water, and a filter between the heater and the outlet, characterised in that means are provided to fill the housing with water up to a maximum level which leaves a headspace between the water and the roof of the housing, the entrance to the outlet being below the operating water level, the water to be treated first passes through a heat exchanger where it is warmed before it passes to the housing treated water leaving the housing is passed through the heat exchanger to warm the incoming untreated water, and the heated water leaving the housing is passed through cooling means before passing back into the heat exchanger.

26. A water treatment apparatus comprising a treatment housing and a heat exchanger, the treatment housing having an inlet for the water to be treated, an outlet for the treated water, a heater within the housing and a filter between the heater and the outlet, characterised in that the inlet to the treatment housing receives water that has passed from a source of untreated water through the heat exchanger and the outlet from the treatment housing passes treated water back through the heat exchanger, and bypass valve means are provided to close the heat exchanger to incoming untreated water and to allow the incoming untreated water to flow directly into the treatment housing whereby the hot treated water passing through the heat exchanger sterilises the heat exchanger.

27. A water treatment apparatus according to claim 26, characterised in that the bypass valve means is a first valve on the inlet pipe to the heat exchanger which is open during normal operation to allow inflow of untreated water and a bypass valve in a bypass pipe between the source of untreated water and the first valve, the bypass valve being closed during normal operation and the first valve being closed and the bypass valve opened to sterilise the heat exchanger.

28. A water treatment apparatus according to claim 26, characterised in that the heater is in direct contact with the water in the housing.

* * * * *